United States Patent [19]

Elmore et al.

[11] 4,118,219

[45] Oct. 3, 1978

[54] PROCESS FOR RECYCLING JUNK LEAD-ACID BATTERIES

[75] Inventors: Marion Edward Elmore, Mendota Heights; James Kenneth Klang, St. Paul Park, both of Minn.

[73] Assignee: Gould Inc., Rolling Meadows, Ill.

[21] Appl. No.: 812,437

[22] Filed: Jul. 1, 1977

Related U.S. Application Data

[63] Continuation of Ser. No. 659,277, Feb. 19, 1976, abandoned.

[51] Int. Cl.$^2$ ............................................. C22B 13/04
[52] U.S. Cl. .......................................... 75/103; 75/77; 75/120; 423/92; 423/98; 423/433; 423/559; 423/619
[58] Field of Search ........................... 75/77, 120, 103; 423/92, 98, 433, 539, 619

[56] References Cited

U.S. PATENT DOCUMENTS

| | | | |
|---|---|---|---|
| 1,148,062 | 7/1915 | Tucker | 423/98 |
| 1,570,438 | 1/1926 | Evans | 423/89 |
| 2,104,076 | 1/1938 | Frick et al. | 75/120 X |
| 2,328,089 | 8/1943 | Mulligan | 75/120 X |
| 3,440,155 | 4/1969 | Pickering et al. | 423/92 X |
| 3,883,348 | 5/1975 | Acoveno et al. | 75/103 |
| 4,024,055 | 5/1977 | Blann | 423/559 X |

*Primary Examiner*—G. Ozaki
*Attorney, Agent, or Firm*—Leydig, Voit, Osann, Mayer & Holt, Ltd.

[57] ABSTRACT

A hydrometallurgical process for recycling the paste and electrolyte of junk lead-acid batteries begins by separating the paste and electrolyte from the junk batteries. The paste and electrolyte are then reacted to increase the lead sulfate content of the paste and reduce the acid content of the electrolyte. Excess liquid is then removed from the mixture of paste and electrolyte, after which the paste is mixed with an aqueous ammoniacal ammonium sulfate solution to dissolve a substantial portion of the lead sulfate from the paste. The remaining solid materials are then separated from the resulting pregnant lead solution, after which lead carbonate is precipitated from the pregnant lead solution by the addition of ammonium carbonate, ammonium bicarbonate or carbon dioxide. The precipitated lead carbonate is removed from the spent liquid and either converted to lead oxide by calcining, or mixed with sulfuric acid and then calcined or reacted with a chemical reducing agent to convert lead dioxide therein to lead oxide, and the lead oxide-containing material is then mixed with sulfuric acid in a second sulfating reaction to increase the lead sulfate content thereof. The resulting product is mixed with an aqueous ammoniacal ammonium sulfate solution to dissolve further lead sulfate therefrom. The resulting pregnant lead solution is separated from any solid materials remaining therein, after which lead carbonate is precipitated from the solution.

30 Claims, 2 Drawing Figures

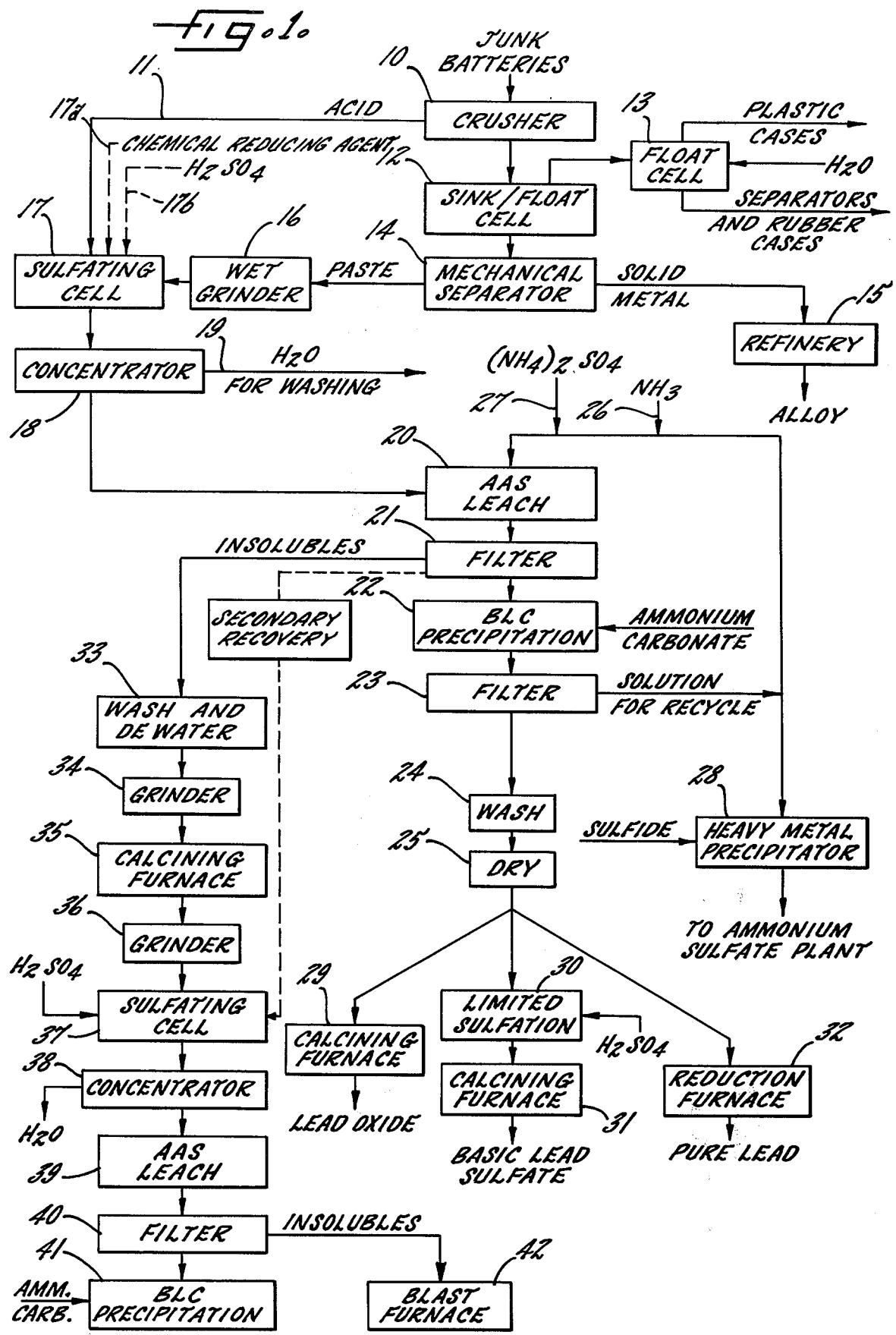

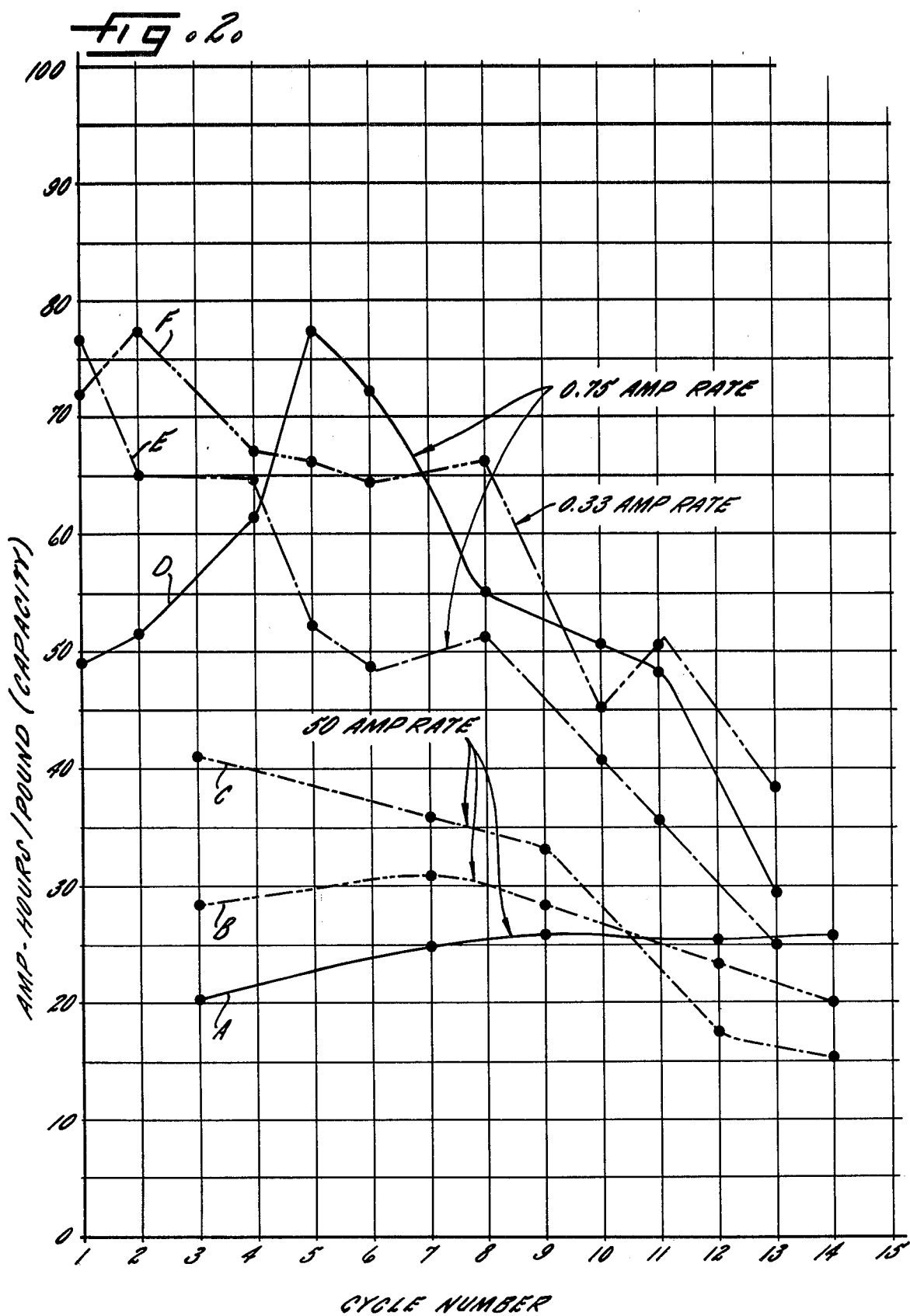

PROCESS FOR RECYCLING JUNK LEAD-ACID BATTERIES

This is a continuation of application Ser. No. 659,277 or Elmore et al., filed 2/19/76 and Process For Recycling Junk Lead-Acid Batteries, now abandoned.

DESCRIPTION OF THE INVENTION

The present invention relates generally to the recycling of junk storage batteries and, more particularly, to a hydrometallurgical process for recycling the paste and electrolyte from junk lead-acid storage batteries.

Lead-acid storage batteries are generally composed of numerous plates containing compounds of lead in the form of a paste and supported by grids of a conductive lead alloy immersed in a sulfuric acid electrolyte solution contained within a non-conductive case made of hard rubber or plastic. Plates of opposite polarity are insulated from each other by means of porous separators, and electrochemical power is drawn from the plates through a conductive lead alloy joined to the plates and generally referred to as the "connecting metal". The chemically active materials contained within the battery paste are lead dioxide at the anode and sponge lead at the cathode. When these active materials are electrically connected in the presence of sulfuric acid, an oxidation-reduction reaction converts both materials to lead sulfate, which remains essentially insoluble in the electrolyte. This reaction also produces water which reduces the concentration of the electrolyte.

By the time the battery is scrapped, it is generally in a state of discharge having a moderate to high concentration of lead sulfate in the paste and a correspondingly low electrolyte concentration. Scrap batteries are generally considered valuable only for their lead content, which has generally been recovered by smelting techniques (e.g., U.S. Pat. Nos. 3,300,043; 3,393,876; and 3,689,253). However, the smelting of lead sulfate presents problems with high temperatures, mattes, slags, and gaseous emissions of sulfur dioxide. Also, the spent electrolyte must be treated for sewage, and the cases and separators are usually burned or discarded as solid waste. The lead recovered from scrap batteries by smelting techniques is generally in the metallic state combined with numerous alloying and impurity metals present in the battery. Consequently, this smelted lead must usually be refined to obtain useful lead alloys, or purified by pyrometallurgical techniques to yield lead metal.

It is a principal object of the present invention to provide an improved process for recovering lead from junk lead-acid batteries in an economic manner and without producing any significant amounts of objectionable environmental pollutants.

It is another object of this invention to provide such an improved process for recovering lead from junk leadacid batteries which requires less energy than the processes that are presently used to recover lead from such junk batteries.

It is a further object of the invention to provide such an improved recovery process which produces ammonium sulfate as a valuable byproduct. Still another object of the invention is to provide such an improved lead recovery process which produces relatively little solid waste material to be disposed.

A still further object of the invention is to provide such an improved recovery process which recovers the lead with a high degree of purity and in a soft form so that it can be readily re-used in battery oxides and non-antimonial alloys.

Other objects and advantages of the invention will be apparent from the following detailed description and the accompanying drawings, in which:

FIG. 1 is a flow diagram for an exemplary process embodying the invention; and

FIG. 2 is a set of curves illustrating the results of certain tests conducted on different battery cells to compare the performance of standard plates with plates prepared with a paste containing lead oxide produced by the process of this invention.

While the invention will be described in connection with certain preferred embodiments, it will be understood that it is not intended to limit the invention to these particular embodiments. On the contrary, the intention is to cover all alternatives, modifications and equivalents included within the spirit and scope of the invention as defined by the appended claims.

Referring now to the drawings, the scrap batteries are broken in a mechanical crusher 10 which breaks the solid parts of the batteries into fragments of about 2 to 6 cm. while allowing the major portion of the liquid electrolyte to drain from the crusher through a line 11. The mechanical crusher 10 may be a conventional hogger or other crushing device known in the art. The solid components, including the battery paste, are conveyed from the crusher 10 to a sink/float cell 12 where the wet leady materials form a high density media on which the lower density materials from the battery cases and separators float and, therefore, can be separated from the leady materials. The lower density materials are skimmed off the top of the cell 12 and conveyed to a water float cell 13 where the materials which float in water, such as polypropylene from plastic battery cases, are separated from the materials which sink in water, such as fragments of hard rubber battery cases and battery separator materials. The plastic material removed from the top of the cell 13 is generally reprocessed, while the rubber and separator material removed from the bottom of the cell 13 is usually discarded as solid waste material.

The heavy density media which sinks in the cell 12 includes both lead paste and structural metal from the original batteries. These two materials are separated from each other in a mechanical separator 14, such as wet screening or vibratory milling equipment, which receives the heavy density media from the bottom of the cell 12. The resulting solid metal fraction is transported to a refinery 15 where the metal is dried, melted and/or smelted and refined to produce lead alloys which can be re-used in new batteries. The wet paste from the mechanical separator 14 is fed to a wet grinder 16 which increases the surface area and leachability of the wet paste before it is fed into a sulfating cell 17.

In accordance with one important aspect of the present invention, the paste and electrolyte separated from the junk batteries are reacted to increase the lead sulfate content of the paste and reduce the acid content of the electrolyte, and the resulting paste is then mixed with an aqueous ammoniacal ammmonium sulfate solution to dissolve a substantial portion of the lead sulfate from the paste. Thus, in the illustrative process the wet paste from the grinder 16 and the liquid electrolyte from the crusher 10 are mixed in the sulfating cell 17. In this cell 17, the paste is allowed to react, preferably under mild agitation, with the sulfuric acid contained in the electrolyte so as to substantially increase the content of lead sulfate in the paste and reduce the acid concentration of the electrolyte. More specifically, the paste consists primarily of lead sulfate ($PbSO_4$), lead dioxide ($PbO_2$), lead oxide (PbO) and a minor amount of lead metal (Pb), the lead oxide reacting directly with the sulfuric acid contained in the electrolyte to produce lead sulfate and water. In addition, as in a discharging battery described previously, lead dioxide and lead metal react in the presence of sulfuric acid to produce lead sulfate and water. It will be appreciated that the utilization of the electrolyte in the sulfating step avoids the otherwise troublesome problem of disposing of the waste electrolyte.

Unlike $PbSO_4$ and PbO, $PbO_2$ is not soluble in the aqueous ammoniacal ammonium sulfate solution, and does not react with the sulfuric acid to form $PbSO_4$ until it is reduced to PbO. A certain amount of the $PbO_2$ is reduced by the Pb in the paste, but there is generally a stoichiometric deficiency of Pb (produced by the negative battery plates) relative to the $PbO_2$ (produced by the positive battery plates). Thus, the excess $PbO_2$ must be reduced by a supplementary treatment, e.g., by calcining or by the addition of a chemical reducing agent such as hydrogen peroxide, formaldehyde, additional Pb or the like. If desired, the chemical reducing agent may be added to the sulfating cell 17 via line 17a, or it may be added in a secondary recovery process farther downstream. In any event, it is preferred to grind the paste before the addition of the reducing agent because the $PbSO_4$ and PbO make it difficult to reduce the $PbO_2$. When calcining is used to reduce the $PbO_2$ (by dissociation), the calcining may be carried out between the grinder 16 and the sulfating cell 17 or in a secondary recovery process farther downstream. After the $PbO_2$ is reduced, it can be easily sulfated so that it will dissolve in the aqueous ammoniacal ammonium sulfate solution.

The sulfating reaction in the cell 17 requires several days to achieve completion under mild agitation at room temperature, by complete reaction is not required for purposes of the present invention. In general, it is sufficient for the reaction to proceed for only a few hours, e.g., three to five hours. If desired, the reaction rate may be increased by elevating the temperature within the cell 17, up to a maximum of about 100° C. Additional sulfuric acid may be added to the sulfating cell 17, as indicated at 17b, to compensate for any deficiency in the amount of electrolyte required to react with all the PbO in the paste. As an alternative, sulfuric acid may be used in place of all the electrolyte, but this is normally not preferred because of the problem of disposing of the electrolyte from the junk batteries.

In order to remove excess liquid from the reaction product formed in the sulfating cell 17, the reaction product is fed into a concentrator 18 where the sulfated paste is allowed to settle to separate it from the major portion of the liquid fraction, which is primarily water. This settled portion is further expressed to reduce the liquid content to less than about 20% by weight, preferably less than 10% by weight. The water or dilute electrolyte that is removed from the sulfated paste in the concentrator 18 is discharged through a line 19 and may be recycled for use in washing operations such as 33 to be described below, or in separation operations such as the float cell 13, or in other operations where high purity water is not required.

To dissolve the lead sulfate out of the concentrated sulfated paste, the paste is transformed from the concentrator 18 to a leaching chamber 20 containing an aqueous ammoniacal ammonium sulfate leaching solution. The leaching solution contains about 2 to 25% by weight ammonia and about 10 to 45% by weight ammonium sulfate, with the preferred composition falling within the ranges of about 10 to 15% ammonia and about 20 to 35% ammonium sulfate. Relatively high concentrations of both ammonia and ammonium sulfate are preferred in order to leach the maximum amount of lead sulfate from the paste. The leaching solution rapidly dissolves significant portions of the lead sulfate contained in the paste, but it does not dissolve lead dioxide or lead metal components of the paste. Nor is there any significant dissolving of antimony, barium, bismuth, arsenic, tin or iron, all of which are metals typically associated with lead-acid storage batteries. Thus, the leaching operation effects a significant improvement in the purity of the lead sulfate derived from the battery paste. Metals which dissolve in the leaching solution include copper, silver, cadmium and the alkali metals.

The leaching operation proceeds at a relatively rapid rate and generally requires less than an hour, typically less than about five minutes, at ambient temperatures under mild agitation. The leaching solution is capable of dissolving up to 10% by weight lead at ambient temperatures, but in actual practice the solution is generally composed of only about 5% by weight lead. Increasing the temperature of the solution increases its dissolving power, but also produces higher ammonia vapor pressures and greater instability of the lead complex in the solution. The optimum reaction time within the leaching chamber 20 is that required to achieve a lead concentration within the range of 5% to 10% by weight in the solution.

For the purpose of separating the undissolved materials, including both impurities and insoluble lead compounds, from the pregnant lead solution produced in the leaching chamber 20, the output of this leaching chamber is passed through a filter 21. The resulting filtrate, which is the pregnant lead solution, enters a precipitation vessel 22 where it is treated to produce lead carbonate, e.g., basic lead carbonate, which is insoluble in the solution and precipitates out as a fine crystalline material. The preferred reactant for effecting the precipitation is ammonium carbonate, ammonium bicarbonate or carbon dioxide. The lead carbonate precipitation step effects a further refinement in the lead being recovered, because the carbonates of other metals which are frequently found in junk batteries such as copper, silver and cadmium remain soluble in the solution to which the ammonium carbonate, ammonium bicarbonate or carbon dioxide is added, and thus such metals are separated from the lead carbonate precipitate.

To separate the lead carbonate from the barren solution from which it is precipitated, the slurry formed in the precipitation vessel is passed through a filter 23, with the recovered solids then being washed and dried as indicated at 24 and 25. The filtrate or spent liquor from the filter 23 is recycled to the leaching chamber 20, with additional ammonia and ammonium sulfate being added via lines 26 and 27 to maintain the desired composition in the ammoniacal ammonium sulfate leaching solution. The ammonia addition is adjusted to maintain the desired free ammonia content in the leaching solution, and the ammonium sulfate is added if water dilution of the leaching solution becomes excessive. These additions can be readily effected by adding the desired amount of ammonia and then forcing the solution through a bed of ammonium sulfate which can be renewed as needed. This techniques ensures a saturated leaching solution of ammonia and ammonium sulfate which has the requisite leaching power.

In order to maintain a relatively constant volume of leaching solution in the leaching chamber 20, a portion of the solution being recycled from the filter 23 to the leaching chamber 20 is continually removed from the system to compensate for the added ammonia and ammonium sulfate and dilution due to the liquid content of the paste entering the leaching chamber. Thus, in the illustrative process a portion of the filtrate from the filter 23 is diverted to a heavy metal precipitator 28 where any dissolved heavy metals, such as copper, silver cadmium and lead, are precipitated as sulfides by the addition of hydrogen sulfide, ammonium sulfide or the like. The resulting metal sulfides precipitates out of the solution and can be removed by filtering. If the solution contains excess lead, it may be forced through a bed of ammonium carbonate to form lead carbonate which is then removed by filtering. The remaining ammonium sulfate solution, which typically contains about 20 to 30 weight percent ammonium sulfate and about 5 to 15 weight percent ammonia, can then be mixed with a high concentration of sulfuric acid to neutralize the free ammonia content and to increase the ammonium sulfate. This is in contrast to the ammonium sulfate solutions that are produced as byproducts in other lead recovery processes, such as in smelting operations, where the ammonium sulfate solution is generally too dilute and impure to be useful as a feed stock for ammonium sulfate plants.

Returning to the lead carbonate that is recovered in the filter 23 and then subsequently washed and dried to remove residual leaching solution and water soluble impurities, this material may be further processed in several different ways. Three optional processes are generally illustrated in the drawing for converting the lead carbonate to lead oxide, basic lead sulfates or pure lead, respectively. To produce lead oxide, the lead carbonate is heated in a calcining furnace 29 at a temperature within the range of 400° to 800° C. to dissociate the lead carbonate into lead oxide, carbon dioxide and water vapor, in addition to any ammonia released from residual ammonium compounds. The lead oxide produced by this calcining operation is a fine powder with a large specific surface. Small amounts of lead sulfate, generally less than 10% by weight are usually associated with the lead oxide, normally in a tetrabasic lead sulfate crystal structure. The lead sulfate presumably comes from sulfate substitution in the basic lead carbonate crystal structure. Calcining the lead carbonate to the oxide typically requires several hours, depending upon the particular equipment and operating temperature employed.

To convert the lead carbonate to basic lead sulfates, which is the second option illustrated in the drawing, the lead carbonate is sulfated with sulfuric acid in a sulfating cell 30, and then calcined in a furnace 31 at a temperature of about 400° to 800° C. for several hours. The resulting products are basic lead sulfates, e.g., tetrabasic lead sulfate, monobasic lead sulfate, normal lead sulfate or mixtures thereof. The amount of sulfuric acid added will determine the type of lead sulfate produced.

If it is desired to convert the lead carbonate to pure lead, the lead carbonate is smelted in a reduction furnace 32 at a temperature of about 800° to 1200° C. to produce pure lead metal. It has been found that the resulting lead metal has an extremely high degree of purity. The carbonate is preferably mixed with carbonaceous reducing agents and simple fluxes when fed to the furnace.

In accordance with a further aspect of this invention, additional lead is recovered from the insoluble materials removed from the leaching solution by converting lead dioxide therein to lead oxide, then mixing the lead oxide-containing material with sulfuric acid to convert the lead oxide to lead sulfate, and finally mixing the resulting product with an aqueous ammoniacal ammonium sulfate solution to dissolve a substantial portion of the lead sulfate therefrom. Thus, in the illustrative process the insoluble materials removed from the leaching solution by the filter 21 are washed and dewatered as indicated at 33 to remove excess liquid. The resulting material is then ground in a wet grinder 34, dried, and calcined in a furnace 35 at a temperature of about 300° to 800° C. to dissociate any lead dioxide present to lead monoxide, or to basic lead sulfates if sulfate is present, and to oxidize any residual lead metal to lead monoxide or basic lead sulfates. Any pieces of battery case or separator material or other organic materials present in the charge to the calcining furnace 35 are consumed in the calcining operation.

To convert the lead oxide in the calcined produced from the furnace 35 to lead sulfate, the calcined product is ground in a grinder 36 and then fed into a secondary sulfating cell 37 where it is reacted with a sulfuric acid solution and/or spent electrolyte. Sulfation of this material is relatively slow, depending upon the composition and specific surface characteristics of the calcined material. Usually several days of sulfation at ambient temperatures are required to complete the reaction, although the reaction can be substantially completed in a matter of hours by increasing the temperature in the sulfating cell 37 to at least about 60° C. To remove excess liquid from the sulfated solution, the output of the cell 37 is fed into a concentrator 38 where the paste is allowed to settle so that excess liquid can be removed to reduce the liquid content of the paste to less than 20% by weight, preferably less than 10% by weight. The resulting paste is then transferred to a secondary leaching chamber 39 containing an aqueous ammoniacal ammonium sulfate solution having essentially the same composition as that described for the primary leaching chamber 20. Insoluble materials are removed from the resulting solution by passing it through a filter 40, and the resulting filtrate, which is the pregnant lead solution, is passed into a precipitator 41 where ammonium carbonate, ammonium bicarbonate or carbon dioxide is added to precipitate the lead in the form of lead carbonate. The insoluble materials removed by the filter 40 may be simply melted in a reduction operation carried out in a blast furnace 42, or further processed by other means to recover their separate metallic contents.

As an alternative to the illustrative secondary recovery process utilizing calcining, the lead dioxide in the insoluble materials removed from the filter 21 can be converted to lead oxide by grinding the insolubles and then adding a chemical reducing agent thereto. The resulting lead oxide can then be fed directly into the sulfating cell 37.

If the original paste from the mechanical separator 14 is treated by calcining or a chemical reducing agent to reduce $PbO_2$ to PbO before the paste is fed to the initial sulfating cell 17, the amount of lead compounds contained in the insolubles removed from the filter 21 should be so small that the secondary lead recovery process can be eliminated completely. In this case, the insolubles are merely treated to recover any other by-products of value therein.

Regardless of whether the reduction of the $PbO_2$ to PbO is effected in the primary or secondary recovery stage of the process, the use of a chemical reducing agent is generally preferred over calcining because the use of the reducing agent provides a continuous "wet" process. This not only eliminates unnecessary drying and grinding steps, but also avoids the production of dry ducts which can present pollution, disposal and safety problems.

EXAMPLE I

Fifty grams of dried battery paste was sulfated by mixing it under mild agitation for 30 minutes with 21.4 g. of used battery electrolyte having a concentration or 21.6% sulfuric acid. The resulting slurry was filtered to remove excess acid (with a concentration of 16.9%), washed with water, and then dried at 100° C. for convenience in further handling. Twenty five grams of the resulting dried material was slurried (with agitation for 5 minutes) with 200 g. of a leaching solution composed of 55.0 g. of ammonium sulfate, 92.1 g. of aqueous ammonia (28–30% $NH_3$), and 52.9 g. of water. The slurry was filtered under vacuum in a fritted glass filter crucible. The collected solids were washed with a small amount of aqueous ammonia, to remove the leaching solution, and then repeated washes of water to ensure the removal of all soluble non-lead compounds. After drying at 100° C. for one hour, the weight of the insoluble material was measured at 12.16 g., indicating a solubility of 12.84 g. or about 51.4% of the sulfated battery paste in the leaching solution.

The pregnant liquor remaining from the vacuum filtering was treated with 6.3 g. of ammonium carbonate which produced a fine white precipitate which was filtered, washed, and dried in the same manner described above. The resultant weight of the precipitate was 10.31 g. or about 94.2% of the dissolved material (i.e., the sulfated battery paste) if it were assumed to be lead sulfate. Thus, 48.42% of the sulfated battery paste originally added to the leaching solution was recovered.

EXAMPLE II

One hundred grams of dried battery paste was ground fine and sulfated by mixing it with 45 g. of used battery electrolyte (21.6% sulfuric acid) and allowed to sit for three days at ambient temperatures. The resulting slurry was filtered, washed, and dried at 100° C., after which 10.17 g. of the dried material was slurried for 5 minutes with 200 g. of leaching solution (composition same as in Example I). This slurry was then filtered, washed, and dried as in Example I. The resulting weight of the solids obtained was 2.33 g. indicating a solubility of 77.1% of the sulfated battery paste in the leaching solution. The increased solubility, as compared with Example I, was attributed to the fine grinding of the original paste and the longer sulfation period.

EXAMPLE III

A portion of dried battery paste was calcined in a crucible placed in a muffle furnace at 500°–750° C. for one hour. After cooling, the calcined material was sulfated by adding it to 150 ml. of 1.4 sp.gr. sulfuric acid and allowing it to react weith occasional stirring for three days. The solids were filtered, washed with water, and dried at 100° C. Ten grams of the dried material was then mixed with 200 g. of a leaching solution with a composition similar to that used in Example I. The resulting slurry was mixed, filtered, washed, and dried as in Example I. The solids remaining weighed 0.65 g. indicating a solubility of 93.5% of the sulfated battery paste in the leaching solution. The increased solubility, as compared with Example I, was attributed to the calcining of the original paste before the sulfating step.

EXAMPLE IV

A 5 g. sample of the calcined material from Example III that was not sulfated was slurried with 100 g. of leaching solution with a composition similar to that used in Example I. The resulting slurry was mixed, filtered, washed and dried as before. The solids remaining weighed 2.46 g. indicating a solubility of 50.8% of the calcined material in the leaching solution. The reduced solubility, as compared with Example III, was attributed to the omission of the sulfation of the original calcined material.

EXAMPLE V

The insoluble material from the leaching step in Example I was calcined at 600° C. for 30 minutes, after which 10.8 g. of the calcined material was treated with 20.0 g. of waste battery electrolyte (21.6% sulfuric acid). After initial stirring the mixture was allowed to react for 15 hours at ambient temperature. The resulting slurry was filtered, washed and dried as before, and then 10.0 g. of the resultant solids was mixed with 100 g. of leaching solution with a composition similar to that used in Example I. The resulting slurry was mixed, filtered, washed and dried as in Example I. The resultant solids weight was 3.87 g. indicating a solubility of 61.3% of the sulfated material in the leaching solution.

The pregnant liquor from the filtering operation was treated with 2.5 g. of ammonium carbonate causing precipitation. After thorough mixing, the resulting slurry was filtered, washed, and dried as before. The resultant weight of the precipitate was 5.47 g. or 104.6% of the dissolved material if it were assumed to be lead sulfate. Thus, 64.12% of the sulfated material originally added to the leaching solution was recovered.

EXAMPLE VI

To 200 ml. of leaching solution with a composition similar to that used in Example I was added an excess of lead sulfate and stirred for several minutes. The resulting solution was filtered from the excess lead sulfate. The pregnant liquor was then slurried with excess ammonium carbonate producing a precipitate of lead carbonate which was filtered from the solution. 175 ml. of the resulting solution was treated with an excess of an ammonium sulfide solution (22% $[NH4]_2S$) forming a black precipitate which was filtered, washed, and dried. It weighed 196 mg. Presuming the black precipitate was lead sulfide, the spent solution had a concentration of soluble lead of about 97 mg. per liter, which indicates that the lead concentration of the pregnant liquor can be reduced to a very low level by the lead carbonate precipitation.

EXAMPLE VII 3.5 g. of the insoluble residue from the leaching step in Example V was mixed with simple fluxes and carbon reductant and smelted at 1000° C. producing 2.5 g. of impure lead. This represented 90.7% recovery of lead from the insoluble residue, assuming the residue to have been monobasic lead sulfate.

EXAMPLE VIII

The purity of the lead oxide and lead generated from the lead carbonate recovered in the above examples was compared to the initial paste material as follows:

|  | Paste | Calcined Lead Oxide | Lead (Smelted BLC) |
|---|---|---|---|
| % Antimony | 1.0 | 0.001 | ND |
| % Barium | 0.06 | ND | ND |
| % Tin | 0.02 | 0.0005 | ND |
| % Copper | 0.005 | −0.0005 | ND |
| % Bismuth | 0.005 | −0.0005 | ND |
| % Iron | 0.001 | −0.0005 | ND |
| % Silver | 0.0005 | −0.0005 | ND |
| % Nickel | 0.0005 | 0.0005 | ND |
| % Others | ND | ND | ND |

A portion of the lead oxide generated from the lead carbonate recovered in the above examples was converted to a battery oxide paste by mixing 80 grams of the oxide with 23.5 grams of water and 4.80 cc of sulfuric acid with a specific gravity of 1.40. The oxide was quite hydrophilic in nature, and a wet cubic weight density of 46.85 grams/cubic inch was obtained. About two thirds of the resulting paste was applied to a standard battery grid 4.3 inch × 5.69 inch × 0.075 inch weighing about 51 grams, and the resulting plate was cured at 180° F. for 8 hours at 100% relative humidity and then air dried at 120° F. for 17 hours. The remainder of the paste was applied to one half of another grid of the same type and cured and dried in the same manner. These dried plates were then used as the positive plates of two three-plate cells containing two negative plates with a great excess of active materials. These cells were formed in 1.040 specific gravity sulfuric acid using a 20-hour formation with a tapering current density program during the last 7 hours. For control reference, two full grid standard type automotive positive plates were prepared using the universal type, Barton pot, leady oxide containing about 20% free lead metal, with a paste formulation resulting in a cubic weight density of 66.64 grams/cubic inch. This paste was applied to the same type of standard grids described above, which were then processed through the formation stage in the same manner described above.

The cells containing the different plates were then tasted by subjecting them to repetitive discharging and charging cycles at discharge rates of 50 and 0.75 amps. When a discharge rate of 50 amps was used, the cells were re-charged from an endpont of about 0.5 volt at a constant current of 0.85 amp. to a return capacity input equal to 120% of the previous discharge. When the discharge rate was 0.75 amp., the cells were re-charged from an endpoint off about 1.7 volts at a constant current of 0.5 amp. to a return capacity input equal to 120% of the previous discharge. The cells were all cycled at the 0.75-amp. rate in cycles 1, 2, 4, 5, 6, 8, 10, 11 and 13, and at the 50-amp rate in cycles 3, 7, 9, 12 and 14.

The results of these tests are shown graphically in FIG. 2 by curves A through F. More specifically, curve A represents the cell with the standard plate at a discharge rate of 50 amps.; curve B represents the full plate with the novel lead oxide at the 50-amp. rate; curve C represents the half plate with the novel lead oxide at the 50-amp. rate; curve D represents the standard plate at a 0.75-amp. rate; curve E represents the full plate with the novel lead oxide at a 0.75-amp. rate; and curve F represents the half plate at about a 0.33-amp. rate. It can be seen that the plates with the novel lead oxide (curves B, C, E and F) exhibited substantially greater initial capacities (amp-hours/pound) at both the high and low discharge rates, thereby demonstrating the utility of the improved characteristics provided by the novel lead oxide of the invention. Based upon the data presented in FIG. 2, it would be expected that SLI (i.e.-starting-lighting-ignition) batteries using the novel oxide in the positive plates would show substantial weight-efficiency improvement over SLI batteries using the standard oxide when subjected to tests simulating SLI conditions.

As can be seen from the foregoing detailed description and the working examples, the process of this invention recovers lead from junk lead-acid batteries in an economic manner and without producing any significant amounts of objectionable environmental pollutants. The process does not produce any gaseous emissions of sulfur dioxide, the principal waste material is water, and the ammonium sulfate solution produced as a byproduct is capable of being used as a feed stock for an ammonium sulfate plant. The process requires a relatively small amount of energy because there are no high temperature steps required other than in the optional calcining furnace and in any other furnaces used to convert the lead carbonate to the different possible end products. There is very little solid waste material to be disposed of other than the fragments of rubber battery cases and separator material removed from the float cell. When the lead carbonate produced by the process is converted to metallic lead, it has a high degree of purity and is in a soft form so that it can be readily re-used in battery oxides and non-antimonial alloys. Finally, the process produces a novel form of lead oxide which provides improved performance characteristics when used in battery plates.

We claim as our invention:

1. A process for recycling the paste and electrolyte of junk lead-acid batteries, said process comprising the steps of
    (a) separating the paste and electrolyte from the junk batteries,
    (b) reacting the paste and electrolyte to increase the lead sulfate content of the paste and reduce the acid content of the electrolyte,
    (c) mixing the resulting paste with an aqueous ammoniacal ammonium sulfae solution to dissolve a substantial portion of the lead sulfate from the paste,
    (d) separating the resulting pregnant lead solution from any solid materials therein,
    (e) and precipitating lead carbonate from the pregnant lead solution.

2. The process of claim 1 wherein said electrolyte contains an insufficient amount of sulfuric acid to react with all the lead oxide in said paste, and additional sulfuric acid is added to the mixture of paste and electrolyte to react with the excess lead oxide and thereby further increase the lead sulfate content of the paste.

3. The process of claim 1 wherein excess liquid is removed from the mixture of paste and electrolyte prior to mixing the paste with the aqueous ammoniacal ammonium sulfate solution.

4. The process of claim 1 wherein lead dioxide in the paste is converted to lead oxide prior to mixing with the electrolyte.

5. The process of claim 4 wherein said paste is calcined to convert the lead dioxide to lead oxide.

6. The process of claim 4 wherein a chemical reducing agent is added to the paste to convert the lead dioxide to lead oxide.

7. The process of claim 6 wherein said paste is ground before the addition of said chemical reducing agent thereto.

8. The process of claim 1 wherein the precipitated lead carbonate is removed from the mother liquor and converted to lead oxide.

9. The process of claim 1 wherein the precipitated lead carbonate is mixed with sulfuric acid and then calcined to produce basic lead sulfates.

10. The process of claim 1 wherein the precipitated lead carbonate is fed to a reduction furnace where it is converted to substantially pure lead.

11. The process of claim 1 which includes the steps of converting lead dioxide to lead oxide in the solid materials separated from the pregnant lead solution, mixing the resulting materials with sulfuric acid to increase the lead sulfate content thereof, and mixing the resulting product with an aqueous ammoniacal ammonium sulfate solution to dissolve a substantial portion of the lead sulfate therefrom.

12. The process of claim 11 wherein said solid materials separated from the pregnant lead solution are calcined to convert the lead dioxide to lead oxide.

13. The process of claim 11 wherein a chemical reducing agent is added to said solid materials separated from the pregnant lead solution to convert the lead dioxide to lead oxide.

14. The process of claim 13 wherein said solid materials are ground before the addition of said chemical reducing agent thereto.

15. The process of claim 11 which includes the steps of separating the resulting pregnant lead solution from any solid materials remaining therein, and precipitating lead carbonate from the pregnant lead solution.

16. The process of claim 1 wherein ammonium sulfate is removed from the solution from which the lead carbonate has been precipitated.

17. The process of claim 1 wherein at least a portion of the solution from which the lead carbonate has been precipitated is recycled to the aqueous ammoniacal ammonium sulfate solution.

18. The process of claim 17 wherein ammonia and ammonium sulfate are added to the recycled solution.

19. A process for recycling the paste of junk lead-acid batteries, said process comprising the steps of
  (a) reacting the paste from the junk batteries with sulfuric acid to convert lead oxide therein to lead sulfate and thereby increase the lead sulfate content of the paste,
  (b) mixing the resulting paste with an aqueous ammoniacal ammonium sulfate solution to dissolve a substantial portion of the lead sulfate from the paste,
  (c) separating the resulting pregnant lead solution from any solid materials remaining therein,
  (d) and precipitating lead carbonate from the pregnant lead solution.

20. A process for recovering lead from junk lead-acid batteries comprising the steps of
  (a) removing all the internal components of the batteries, including the acid, from the battery cases and mixing said internal components together to convert lead oxide therein to lead sulfate,
  (b) adding ammoniacal ammonium sulfate to said mixture to leach the lead from said mixture,
  (c) precipitating lead carbonate from the resulting solution and removing the precipitate from the solution,
  (d) and converting the lead carbonate to lead oxide by the removal of carbon dioxide from the carbonate.

21. A process for recovering lead from junk lead-acid batteries comprising the steps of
  (a) removing all the internal components of the batteries, including the acid, from the battery cases and mixing said internal components together to convert lead oxide therein to lead sulfate,
  (b) adding ammoniacal ammonium sulfate to said mixture to leach the lead from said mixture,
  (c) precipitating lead carbonate from the resulting solution and removing the precipitate from the solution,
  (d) and mixing the lead carbonate with sulfuric acid and then calcining the resulting mixture to produce basic lead sulfates.

22. A process for recovering lead from junk lead-acid batteries comprising the steps of
  (a) removing all the internal components of the batteries, including the acid, from the battery cases and mixing said internal components together to convert lead oxide therein to lead sulfate,
  (b) adding ammoniacal ammonium sulfate to said mixture to leach the lead from said mixture,
  (c) precipitating lead carbonate from the resulting solution and removing the precipitate from the solution,
  (d) and converting the lead carbonate to substantially pure lead in a reduction furnace.

23. A process for recycling the paste from junk lead-acid batteries, said process comprising the steps of
  (a) separating a paste containing lead dioxide from the junk batteries,
  (b) converting the lead dioxide in the paste to a form of lead that is soluble in an aqueous ammoniacal ammonium sulfate solution.
  (c) mixing the resulting soluble lead product with an aqueous ammoniacal ammonium sulfate solution to dissolve a substantial portion of the lead from said soluble lead product,
  (d) and removing the lead from the resulting pregnant lead solution.

24. The process of claim 23 wherein said lead dioxide is converted to lead oxide by calcining the paste, and said lead oxide is then converted to lead sulfate.

25. The process of claim 23 wherein said lead dioxide is converted to lead oxide by adding a chemical reducing agent to the paste, and said lead oxide is then converted to lead sulfate.

26. The process of claim 25 wherein the paste is ground before the addition of the chemical reducing agent.

27. The process of claim 23 wherein said lead dioxide is converted to lead oxide, and said lead oxide is then converted to lead sulfate by reacting the paste with electrolyte separated from the junk batteries.

28. The process of claim 23 wherein the lead is removed from said pregnant lead solution by separating said solution from any solid materials therein, and then precipitating lead carbonate from the pregnant lead solution.

29. A process for recycling the paste from junk lead-acid batteries, said process comprising the steps of
(a) separating a paste containing lead sulfate, lead oxide and lead dioxide from the junk batteries,
(b) converting the lead dioxide in the paste to lead oxide,
(c) reacting the paste with sulfuric acid to convert the lead oxide therein to lead sulfate,
(d) mixing the resulting paste with an aqueous ammoniacal ammonium sulfate solution to dissolve a substantial portion of the lead sulfate from the paste,
(e) and removing the lead from the resulting pregnant lead solution.

30. Lead oxide produced by reacting the paste from junk batteries with sulfuric acid to convert lead oxide therein to lead sulfate, mixing the resulting paste wiith an aqueous ammoniacal ammonium sulfate solution to dissolve a substantial portion of the land sulfate from the paste, separating the resulting pregnant lead solution from any solid materials remaining therein, precipitating lead carbonate from the pregnant lead solution and removing the precipitate from the solution, and converting the lead carbonate to lead oxide by the removal of carbon dioxide from the carbonate.

* * * * *